United States Patent
Drochon

(10) Patent No.: US 9,034,807 B2
(45) Date of Patent: May 19, 2015

(54) SPACER FLUID ADDITIVE

(75) Inventor: Bruno Drochon, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1267 days.

(21) Appl. No.: 12/336,155

(22) Filed: Dec. 16, 2008

(65) Prior Publication Data

US 2009/0156436 A1 Jun. 18, 2009

(51) Int. Cl.
*C09K 8/68* (2006.01)
*C09K 8/40* (2006.01)

(52) U.S. Cl.
CPC ........................... *C09K 8/40* (2013.01)

(58) Field of Classification Search
None
See application file for complete search history.

(56) References Cited

U.S. PATENT DOCUMENTS

| 4,569,395 | A | 2/1986 | Carpenter |
| 4,967,839 | A | 11/1990 | Carpenter et al. |
| 5,009,269 | A | 4/1991 | Moran et al. |
| 5,850,880 | A | 12/1998 | Moran et al. |
| 2007/0284104 | A1* | 12/2007 | Beckman ...................... 166/293 |
| 2007/0284105 | A1* | 12/2007 | Beckman ...................... 166/293 |

OTHER PUBLICATIONS

Extended search report for the equivalent EP patent application No. 07123490.0 issued on Jun. 5, 2008.

* cited by examiner

*Primary Examiner* — John J Figueroa
(74) *Attorney, Agent, or Firm* — Michael Dae

(57) ABSTRACT

A spacer fluid comprises a fluid and a viscosity agent. The viscosity agent is a mixture of at least two polyvinylalcohol compositions. A first polyvinylalcohol composition comprises polyvinylalcohols having a first degree of hydrolysis and a second polyvinylalcohol composition comprises polyvinylalcohols having a second degree of hydrolysis. The first and second degrees of hydrolysis are substantially different such that the rheology of the spacer fluid is stable during temperatures changes.

6 Claims, No Drawings

SPACER FLUID ADDITIVE

CROSS-REFERENCE TO RELATED APPLICATIONS

This application claims the benefit of EP Patent Application 07123490.0 filed Dec. 18, 2007, entitled "Spacer Fluid Additive."

BACKGROUND OF THE INVENTION

The statements in this section merely provide background information related to the present disclosure and may not constitute prior art.

This invention relates to well cementing operations for oil, gas, water, and geothermal wells and the like. In particular the invention relates to the use of polyvinyl alcohols as an additive to maintain the rheological properties of spacer fluids in such operations.

When an oil well is drilled, a drilling fluid is circulated in the well. The main purpose of the fluid is to lubricate the drilling operations, to control the hydrostatic pressure in the well, and to convey the debris (drill cuttings etc) to the surface and out of the hole. At certain points during the drilling operation, a tubular element or casing is lowered into the drilling hole and cemented by pumping a cement slurry through the casing and into the annular space between the casing and the borehole wall where it is allowed to set. This provides good isolation of the formations through which the borehole passes. Normally a flushing or pre-flushing fluid is pumped through the well before pumping the cement slurry. This flushing fluid, generally referred to as a spacer fluid has two main purposes: to drive out the drilling fluid which is initially situated in the annulus, and to separate the cement slurry and the drilling fluid. It is important to separate the cement slurry and drilling fluid as generally these two fluids are incompatible and mixing of the two can lead to problems, especially in the setting and set properties of the cement. In order to be capable of fulfilling these purposes the fluid present between the drilling mud and cement slurry must maintain stable interfaces between the different fluids and must clean the walls of the borehole before the cement is placed. To obtain a good cement bond the fluid must completely displace the drilling fluid and must remove all residues from the surface of the casing and of the well of the drilling hole, thereby making it possible to achieve good zonal isolation by obtaining good bonding between the cement and the formation and between the cement and the casing.

The presence of a loading agent in the fluid means that it is necessary to add a viscosity-increasing polymer in order to stabilize the suspension particles by creating a yield stress. Designing a spacing fluid consequently consists of finding a minimum concentration of polymer to obtain stable suspensions. In the present application the term "stability" means that the suspension will exhibit no significant sedimentation for at least two hours. This criterion is important in order to avoid the deposition or sedimentation of particles when unexpected stoppages in pumping occur. and the stability is also important in order to ensure that for the period of time which elapses between the mixing of the fluid and its pumping at the surface, no sedimentation occurs in the storage vessel, even in cases where stirring is insufficient. A period of two hours is generally sufficient to result in the necessary stability.

Unfortunately the viscosity of a polymer solution decreases significantly as temperatures increase. As a consequence, to maintain enough viscosity at high temperatures the concentration of polymer has to be increased, however this can result in the fluid exhibiting a high rheological properties at the surface i.e. at ambient temperature. Typical viscosity increasing agents are welan gum, gelan gum, modified guar gum or scleroglucane. Welan gum (Biozan®) is often used to stabilize suspensions is as its rheological properties are less temperature sensitive compared to other polymers. However it still requires at least 30 mins at ambient temperature to be fully hydrated.

Therefore the object of the invention is to provide a viscosity increasing agent for a spacer fluid that will provide constant rheological properties to the spacer fluid during the placement of the fluid down a wellbore.

SUMMARY OF THE INVENTION

Accordingly a first aspect of the invention comprises a spacer fluid comprising a fluid and a viscosity agent wherein the viscosity agent is a mixture of at least two polyvinyl alcohol compositions including a first polyvinyl alcohol composition comprising polyvinyl alcohols having a first degree of hydrolysis and a second polyvinyl alcohol composition comprising polyvinyl alcohols having a second degree of hydrolysis, wherein the first and second degrees of hydrolysis are substantially different such that the rheological properties of the spacer fluid is stable during temperatures changes.

Preferably the first polyvinyl alcohol composition comprises polyvinyl alcohols soluble in the spacer fluid at a different temperature than the polyvinyl alcohols in the second composition. The first composition comprises polyvinyl alcohols soluble at room temperature. The second composition comprises polyvinyl alcohol soluble in the spacer fluid at a temperature above room temperature.

Preferably the viscosity agent of the spacer fluid comprises a composition comprising partially hydrolyzed polyvinyl alcohol. Such a polyvinyl alcohol can be a polyvinyl alcohol at 88% hydrolysis.

Preferably the viscosity agent of the spacer fluid comprises a composition comprising fully hydrolyzed polyvinyl alcohol. Such a polyvinyl alcohol can be a polyvinyl alcohol at 99% hydrolysis.

Preferably the first composition comprises partially hydrolyzed polyvinyl alcohols and the second composition comprises fully hydrolyzed polyvinyl alcohols.

A second aspect of the invention comprises a method for displacing drilling fluid from a well. The method comprising displacing the drilling fluid with a spacer fluid as described above.

MODE(S) FOR CARRYING OUT THE INVENTION

The present invention comprises a spacer fluid that comprises polyvinyl alcohols where the polyvinyl alcohols are selected to maintain constant rheological properties for the spacer fluid. The rheological properties of the spacer fluid can change as the temperature at the bottom hole is higher than the temperature at the surface of the wellbore. However by providing a mixture of polyvinyl alcohols to the spacer fluid the rheological properties of the fluid can be maintained even during temperature changes in the wellbore.

Polyvinyl alcohol is commonly manufactured by hydrolysis whereby the acetate groups of polyvinyl acetate (PVAc) are replaced with hydroxyl groups. The extent of hydrolysis will determine the amount of residual acetyl groups and this will affect the viscosity characteristics of the polymer.

Polyvinyl alcohol is a water-soluble resin that generally dissolves easily in water, however the solubility of the polyvinyl alcohol depends on the degree of polymerization and the degree of hydrolysis. The lower the degree of polymerization, the easier the polyvinyl alcohol dissolves in water and generally partially hydrolyzed grades of polyvinyl alcohol are easier to dissolve than fully hydrolyzed grades. The dissolution rate of polyvinyl alcohol is also temperature dependant. The higher the temperature, the greater the rate of dissolution, with partially hydrolyzed grades of polyvinyl alcohol dissolving more easily at room temperature than fully hydrolyzed grades, which are not easily dissolved at room temperature. The dissolution rate of fully hydrolyzed grades varies according to the degree of crystallinity, while partially hydrolyzed grades show little susceptibility to heat treatment conditions.

The molecular weight of polyvinyl alcohol is generally expressed in terms of solution viscosity and are typically classified as ultra low, low medium and high viscosity, as indicated in Table 1. The degree of hydrolysis is commonly denoted as super, fully, intermediate and partially hydrolyzed. The degree of hydrolysis is generally considered for partially hydrolyzed PVA to be about 87-89% hydrolyzed, for intermediately hydrolyzed PVA to be about 91-96.5% hydrolyzed, for fully hydrolyzed PVA to be about 98-99% hydrolyzed and for super hydrolyzed to be about 99.3-100%.

TABLE 1

Characteristics of polyvinyl alcohols.

| Viscosity (in centipoises) | Viscosity Type | Degree of Polymerization | Average Molecular Weight Range |
|---|---|---|---|
| 3-4 cps | Ultra low | 150-300 | 13,000-23,000 |
| 5-6 cps | Low | 350-650 | 31,000-50,000 |
| 22-30 cps | Medium | 1,000-1,500 | 85,000-124,000 |
| 45-72 cps | High | 1,600-2,200 | 146,000-186,000 |

Therefore by selecting polyvinyl alcohols having different degrees of hydrolysis, with one being soluble at a first temperature and the others becoming soluble at a higher temperature than the first temperature, it allows the viscosity of the spacer fluid to be maintained when the temperature of the fluid increases. If only one water soluble polymer is used then, a change in rheological properties can occur due to thermal thinning of the fluid. Using mixtures of polyvinyl alcohols having different degrees of hydrolysis in the spacer fluid stabilizes the rheological properties of the fluid when subjected to changes in temperatures.

The viscosity of the spacer fluid at ambient temperatures can be controlled by selecting the degree of polymerization and the concentration of the partially hydrolyzed polyvinyl alcohol. Optimum solubility occurs at 87-89% hydrolysis and grades of polyvinyl alcohol in this range of hydrolysis exhibit a high degree of cold water solubility.

The fully hydrolysed polyvinyl alcohols are insoluble at ambient temperature when mixed in the spacer fluid, and therefore will not affect the viscosity of the slurry at this stage. However as the temperature increases during placement of the fluid down the wellbore the fully hydrolyzed PVA will begin to dissolve in the spacer fluid. This counteracts the thermal thinning of the fluid and allows the viscosity of the spacer fluid to be maintained. Maintaining the viscosity of the spacer fluid is important as it allows the weighting agents of the spacer fluids to be maintained in the suspension and allows for proper mud displacement.

When displacing drilling fluid from a wellbore, the spacer fluid and a viscosity agent are mixed together. The viscosity agent contains a mixture of polyvinyl alcohol compositions, the polyvinyl alcohols in each composition having a different degrees of hydrolysis than the polyvinyl alcohols presents in the other compositions. One composition of the mixture can contain partially hydrolyzed polyvinyl alcohols and another composition of the mixture contains fully hydrolyzed polyvinyl alcohols. However the viscosity agent may also comprise further polyvinyl alcohol compositions having further degrees of hydrolysis. At the surface, at ambient temperatures, only the partially hydrolyzed PVA will be soluble in the spacer fluid. The spacer fluid is then pumped down the borehole to displace the drilling fluid from the annulus of the wellbore. As the drilling fluid is pumped down the wellbore and the temperature of the fluid increases, the fully hydrolysed PVA in the spacer fluid will begin to solubilize, maintaining the viscosity and stabilizing the rheological properties of the spacer fluid. The cement slurry is then able to be pumped down the wellbore, and a good bond between the cement and the formation and the cement and the casing can be obtained.

The following example serves to further illustrate the invention.

Example 1

Two polyvinyl-alcohol products were obtained from Celanese, and their properties are given in Table 2.

TABLE 2

Properties of polyvinyl-alcohol products.

| | Hydrolysis, % | Viscosity of 4% solution, 20° C. | Comments |
|---|---|---|---|
| Celvol 165SF | 99.3+ | 62-72 mPa · s | Superfine grade |
| Celvol 540S | 87-90 | 45-55 mPa · s | |

Solutions of Celvol 165SF and Celvol 540S were prepared by mixing with tap water for 1 min in a Waring blender operating at 1,000 RPM. The polymer concentration in each solution was 4 g/100 mL. Viscosity measurements were recorded at 27° C. and 85° C. after the solutions were conditioned in an atmospheric consistometer for various time periods. The results are shown in Table 3.

TABLE 3

Effect of temperature and conditioning time on viscosity of polyvinyl-alcohol solutions.

| | | Viscosity, mPa · s | | | | |
|---|---|---|---|---|---|---|
| Conditioning time | | 0 min | 10 min | 20 min | 60 min | 130 min |
| 4 g 540S | 27° C. | 48.5 | 34.4 | 32.9 | | |
| | 85° C. | | 7.1 | | | |
| 4 g 165SF | 85° C. | 1.1 | 8.7 | 8.7 | 8.7 | 9.8 |

Next, two blended-polymer solutions were prepared. One contained 4 g Celvol 165SF and 4 g Celvol 540S dissolved in 100 mL tap water. The other contained 3 g Celvol 165SF and 4 g Celvol 540S dissolved in 100 mL tap water. Solution viscosities were measured at 27° C. and 85° C. after 20 min conditioning in an atmospheric consistometer. The results are shown in Table 4.

TABLE 4

Effect of temperature on viscosity of
blended polyvinyl-alcohol solutions.

| | | Viscosity after 20 min conditioning, mPa·s |
|---|---|---|
| 4 g 165SF + 4 g 540S | 27° C. | 43 |
| | 85° C. | 87 |
| 3 g 165SF + 4 g 540S | 27° C. | 40 |
| | 85° C. | 45 |

Finally, the blended-polymer solutions described in Table 4 were densified by adding barite. In one fluid, 200 g barite was added to 400 mL of a solution containing 12 g Celvol 165F and 16 g Celvol 540S. In another fluid, 250 g barite was added to 400 mL of a solution containing 12 g Celvol 165F and 16 g of Celvol 540S. When barite was added, there was an additional step of 5 min mixing in a Waring blender operating at 1,000 RPM. Fluid viscosities were measured at 27° C. and 85° C. after 20 min conditioning in an atmospheric consistometer. The results are shown in Table 5.

TABLE 5

Effect of temperature on viscosity of blended polyvinyl-alcohol
solutions densified with barite.

| | | Viscosity after 20 min conditioning, mPa·s |
|---|---|---|
| 12 g 165SF + 16 g 540S + 200 g barite | 27° C. | 59 |
| | 85° C. | 69 |

TABLE 5-continued

Effect of temperature on viscosity of blended polyvinyl-alcohol
solutions densified with barite.

| | | Viscosity after 20 min conditioning, mPa·s |
|---|---|---|
| 12 g 165SF + 16 g 540S + 250 g barite | 27° C. | 67 |
| | 85° C. | 76 |

The invention claimed is:

1. A method for displacing drilling fluid from a well, comprising displacing the drilling fluid with a spacer fluid comprising a fluid and a viscosity agent, wherein the viscosity agent is a mixture of at least two polyvinyl-alcohol compositions including a first polyvinyl-alcohol composition consisting of partially hydrolyzed polyvinyl alcohols having a first degree of hydrolysis and a second polyvinyl-alcohol composition consisting of fully hydrolyzed polyvinyl alcohols.

2. The method of claim 1, wherein the first and second compositions comprise polyvinyl alcohols that are soluble in the fluid at different temperatures.

3. The method of claim 1, wherein at least the first composition comprises polyvinyl alcohols soluble in the fluid at room temperature.

4. The method of claim 1, wherein the second composition comprises polyvinyl alcohols soluble in the fluid at a temperature above room temperature.

5. The method of claim 1, wherein the second composition comprises polyvinyl alcohol at 99% hydrolysis.

6. The method of claim 1, wherein the first composition comprises polyvinyl alcohols at 88% hydrolysis.

* * * * *

UNITED STATES PATENT AND TRADEMARK OFFICE
CERTIFICATE OF CORRECTION

| | | |
|---|---|---|
| PATENT NO. | : 9,034,807 B2 | Page 1 of 1 |
| APPLICATION NO. | : 12/336155 | |
| DATED | : May 19, 2015 | |
| INVENTOR(S) | : Bruno Drochon | |

It is certified that error appears in the above-identified patent and that said Letters Patent is hereby corrected as shown below:

Title page

Item (30) Foreign Application Priority Data:

Please add claim for priority of EP 07123490.0 filed December 18, 2007

Signed and Sealed this
Twelfth Day of April, 2016

Michelle K. Lee
*Director of the United States Patent and Trademark Office*